United States Patent [19]

Long

[11] Patent Number: 4,459,592
[45] Date of Patent: Jul. 10, 1984

[54] METHODS OF AND CIRCUITS FOR SUPPRESSING DOPPLER RADAR CLUTTER

[76] Inventor: Maurice W. Long, 1036 Somerset Dr., NW., Atlanta, Ga. 30327

[21] Appl. No.: 278,436

[22] Filed: Jun. 24, 1981

Related U.S. Application Data

[63] Continuation-in-part of Ser. No. 202,656, Oct. 31, 1980, abandoned.

[51] Int. Cl.³ .............................................. G01S 9/02
[52] U.S. Cl. ...................................... 343/7 A; 343/7.7
[58] Field of Search ................ 343/7.7, 5 CE, 5 CF, 343/5 SW, 7 A, 5 DP; 328/165

[56] References Cited

U.S. PATENT DOCUMENTS

| | | | |
|---|---|---|---|
| 3,465,336 | 9/1969 | Fishbein et al. | 343/7 A |
| 3,755,813 | 8/1973 | Evans et al. | 343/7.7 |
| 3,875,569 | 4/1975 | Hill et al. | 343/5 CF X |
| 3,922,660 | 11/1975 | Galvin | 343/7.7 X |
| 3,968,490 | 7/1976 | Gostin | 343/7.7 |
| 3,971,997 | 7/1976 | Lewis et al. | 343/7.7 X |
| 4,074,264 | 2/1978 | Wilmot | 343/5 DP X |
| 4,075,703 | 2/1978 | Dillard | 343/7 A X |
| 4,122,448 | 10/1978 | Martin | 343/7.7 |
| 4,242,682 | 12/1980 | Musha et al. | 343/5 CF X |

*Primary Examiner*—S. C. Buczinski
*Assistant Examiner*—M. R. Gordon
*Attorney, Agent, or Firm*—James R. Gaffey

[57] ABSTRACT

Clutter suppressors and methods of clutter suppression for radars which employ the doppler effect for enhancing signals due to moving targets relative to signals due to clutter caused land, sea or rain. Specifically, the disclosure concerns suppressors and methods of clutter suppression for cw doppler, pulse doppler and MTI (moving target indication) radars. The suppressors reduce the occurrence of radar output due to clutter by permitting and prohibiting radar output on the basis of the relative strength of signals that contain doppler frequency components of the radar echo.

30 Claims, 14 Drawing Figures

METHODS OF AND CIRCUITS FOR SUPPRESSING DOPPLER RADAR CLUTTER

CROSS REFERENCE TO RELATED APPLICATIONS

The application is a continuation-in-part of application Ser. No. 202,656 filed on Oct. 31, 1980, now abandoned and entitled "Methods of and Circuits for Suppressing MTI Radar Clutter", the disclosure of which is incorporated herein in its entirety by reference.

BACKGROUND OF THE INVENTION

This invention relates to methods of and circuits for suppressing radar output due to clutter while retaining desired output due to targets that are moving with velocities different than those of clutter. The invention is applicable to radars that operate on the doppler principle of detection and therefore it is applicable to cw doppler, pulse doppler and MTI (moving target indication) radars.

The principles of the three aforementioned types of radars are given in Chaps. 3 and 4 of the book *Introduction of Radar Systems*, McGraw-Hill Book Company, 1980, by M. I. Skolnik. Basically, for the three radar types, radar echo signals containing doppler frequency components are received and doppler filtering (processing) is used for selectively enhancing signals due to targets relative to signals due to clutter. Then, ideally, at the radar output target signals are unsuppressed by the doppler processing and clutter signals are of negligible strength because of attenuation caused by the doppler processing.

As explained herein under DETAILED DESCRIPTON OF THE PREFERRED EMBODIMENTS, a variety of circuits and methods are employed for accomplishing the doppler processing (filtering) used for radars that employ the doppler principle. Even so, if the unprocessed radar clutter echo is much larger than the echo of a desired target, the radar output due to clutter for a cw, pulse doppler, or MTI radar can be non-negligible and therefore troublesome.

The usual technique for rejecting clutter at the output of a doppler processor is to employ an amplitude threshold level below which signals are rejected. Unfortunately, the threshold rejects the weaker targets and passes the stronger clutter and therefore amplitude thresholding is satisfactory only if, at the output of the doppler processor, the important target signals are stronger than most of the clutter. To improve the efficiency of thresholding radar output, CFAR (constant false alarm ratio) circuitry is used. The CFAR operates by sampling clutter and predicting future clutter levels based on the sampled clutter and assumptions about the variability of clutter. Although CFAR performance is sometimes reasonably effective against uniform clutter, it is an inefficient suppressor of clutter from non-homogeneous terrain.

Generally, ground clutter is not homogeneous and often consists of isolated and very strong clutter areas interspersed with areas of negligible clutter. The invention will effectively reject this isolated clutter even though it is very strong, and consequently the invention will improve the detectability of moving targets in an environment containing sources of strong clutter.

SUMMARY OF THE INVENTION

Doppler radars use doppler processors to suppress clutter signals and to retain target signals on the basis of the relative strengths of the doppler frequency components contained in the echo signal. The better known doppler processors include MTI (delay-line) cancelers, bandpass filters and banks of bandpass filters. Although the relative radar-clutter motion (due, e.g., to the ground speed of an airborne radar) can cause doppler fluctuations, the reader should recognize that methods and apparatus which compensate for relative motion are a well-established part of the radar art. Exemplary examples are given under Detailed Descripton of the Preferred Embodiments. Throughout this application, the term "doppler radar" refers to either MTI, cw doppler or pulse doppler radar.

The present invention concerns clutter suppressors and methods of suppressing clutter for doppler radar which provides improved detection of moving targets in clutter caused by stationary or slowly moving objects such as land and sea surfaces. In principle, the output of a doppler radar is zero for echo due to a stationary object. However, because of a number of factors including radar instabilities due, e.g., to pulse-to-pulse variations in transmit frequency and transmit pulse amplitude, the output of a doppler radar caused by a stationary object fluctuates and the average is proportional to the echo strength of the object. Therefore, doppler radar output caused by stationary objects is sometimes much stronger than the doppler output caused by rapidly moving targets.

The motion of an antenna beam that scans scross an extended rough surface, due for example to trees, land or sea, causes yet another source of clutter output in a doppler radar, even if the beam motion is perpendicular to the radar line-of-sight. When an antenna beam moves across such an area, the particular elements of the area that are being momentarily viewed by the radar are being continuously changed so as to cause random echo fluctuations. Therefore, because of the erratic echo changes caused by scanning across a naturally rough surface, the radar echo is comprised of randomly generated doppler frequency components that are not totally suppressed by a radar doppler processor. Exemplary examples of the present invention are given under DETAILED DESCRIPTION OF THE PREFERRED EMBODIMENTS which use integrators to minimize the deleterious effects of system noise, caused for example by radar instabilities, or echo fluctuations caused by antenna beam movement.

As explained under Background of the Invention, CFAR (constant false alarm ratio) circuitry can sometimes be used effectively to suppress clutter due to uniform clutter but, even so, CFAR is effective only if the received signals due to the target of interest are stronger than most of the clutter signals. Under many circumstances the CFAR circuitry, which rejects and passes signals on the basis of received signal strength, rejects the weaker targets and passes the stronger clutter.

The present invention effects on the basis of the relative strength of a signal that is processed and another signal that is not processed by the doppler processor; therefore, clutter suppression is not based on signal strength, per se. With the present invention, stationary objects will create signals that will be passed, independent of echo strength, as radar output for a small fraction of the time where the fraction depends on a threshold ratio established within a ratio comparator. In this manner the invention can effectively suppress strong echo, independent of strength, due to stationary objects and yet suppress the echo for moving targets for only a negligible fraction of the time.

As already outlined, CFAR circuitry and the present invention operate on entirely different principles: CFAR rejects all signals with strength below the CFAR threshold level and passes all signals with strength above that CFAR level. On the other hand, the present invention rejects and passes signals on the basis of the relative strenght of doppler processed and unprocessed signals which are simultaneously compared. Therefore, a combination of CFAR circuitry and the present invention can be used effectively, as follows:

(1) The CFAR threshold level can be set at a sufficiently low level so that no moving target of interest is rejected. Then, clutter that is weaker than the targets will be rejected and targets and strong clutter will pass the CFAR circuitry;

(2) The threshold ratio can be established within the ratio comparator of the present invention so that the strong echoes due to stationary targets that pass the CFAR circuitry are rejected for a sufficiently high fraction of the time so that effects of strong clutter are negligible.

In summary, the present invention provides efficient methods of and circuits for suppressing strong clutter due to stationary or slowly moving objects. Further, the basic present invention, when operated in association with CFAR circuitry, provides an improved circuit for efficiently suppressing signals due to homogeneous, rapidly moving clutter plus clutter due to unusually strong, stationary objects. For example, clutter due to rain can sometimes be satisfactorily reduced with CFAR circuitry. Then, the present invention operating in association with CFAR will be effective for suppressing the rain and strong echoes from stationary objects.

The objects of the present invention are to provide circuits and methods that:

(1) Will suppress echoes due to clutter to a greater extent than is possible with cw doppler, MTI or pulse doppler radar alone, (2) Can be used in combination with CFAR circuitry for improving the clutter suppression capabilities of cw doppler, MTI or pulse doppler radar, (3) Can be used with MTI and pulse doppler radars which use MTI (delay-line) cancelers that process either unipolar video, bipolar video (either single signal or I and Q signals), IF or RF signals, (4) Can be used with cw doppler radar that uses a bandpass doppler filter or a plurality of bandpass doppler filters, (5) Can be used with a pulse doppler or a MTI radar which uses a bandpass doppler filter or a plurality of bandpass doppler filters, (6) Can be used with a pulse doppler or a MTI radar which uses a MTI (delay-line) canceler and a doppler bandpass filter or a MTI (delay-line) canceler and a plurality of bandpass filters.

To accomplish these objects, a plurality of signals containing doppler frequency components of different magnitudes are simultaneously compared and radar output is permitted if the ratio of the strengths of two of said signals is within a predetermined ratio; otherwise, radar output is rejected. Thus, clutter can be rejected even if due to objects which cause very strong echo.

DETAILED DESCRIPTION OF THE PREFERRED EMBODIMENTS

Figure 1:
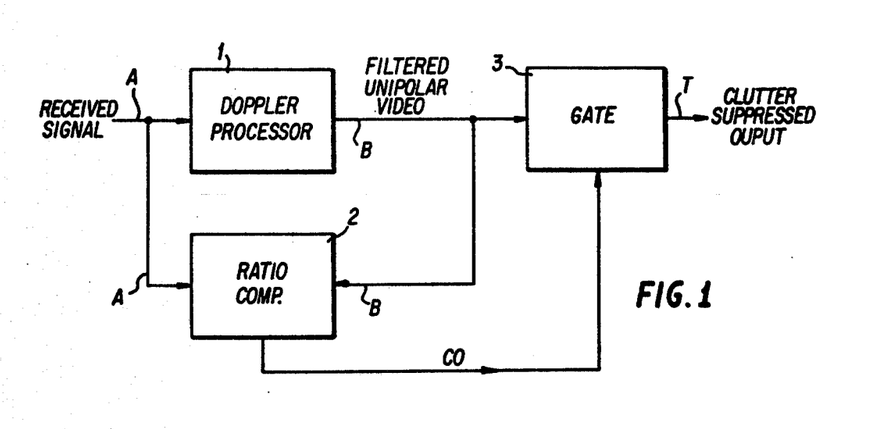
FIG. 1 is a block diagram illustrating the principal features of an exemplary embodiment of a radar clutter suppressor in accordance with the present invention.

FIG. 1 illustrates the principal features of the invention. A doppler transmitter-receiver provides received signal A which is processed by a doppler processor 1 to provide doppler filtered unipolar video signal B. Basically, a doppler processor operates as follows:

1. For a stationary object, it causes the strength of signal B to be much less than that of signal A. Therefore, for a stationary object the ratio of the signal B strength to the signal A strength is very small, and 2. For a moving target, the relative strength of signals A and B depends on target velocity, but the ratio of the strengths of signal B to signal A is rarely as small as that ratio for a fixed target.

Signal B is, as illustrated for the purpose of providing an example, a unipolar video signal and can be used as the input signal for a radar display. Received signal A need not be a unipolar video signal and can, e.g., be either unipolar video, bipolar video, an IF signal or a RF signal.

The operation of FIG. 1 for obtaining clutter suppressed signals is now explained. The ratio comparator 2 compares the strengths of signals A and B and provides a comparator output signal CO when signal A does not exceed signal B by a predetermined ratio, this ratio being much greater than unity; otherwise, the comparator 2 output signal CO is zero. The presence of signal CO as input to the gate 3 permits signal B to pass as radar output, thereby providing signal T as clutter suppressed output. Therefore, as has now been explained, the filtered output, signal B, of a doppler radar is passed as clutter suppressed output only when the strength of signal A does not exceed that of signal B by a large predetermined ratio. For example, assume a predetermined ratio of 20 dB. Then, if signal A exceeds signal B by more than 20 dB, radar output is rejected. For this ratio gate 3 would rarely reject a signal caused by a moving target. However, for stationary or slowly moving objects such as ground and sea clutter, signal B would ordinarily be weaker than 20 dB below signal A and therefore the gate 3 would prohibit radar output.

Thus far the general features of the invention have been described with reference to FIG. 1. Basically, for a fixed or slowly moving object the strength of signal B will be much less than that of signal A. Under these conditions, radar changes (due, e.g., to slight changes in transmit frequency or amplitude) cause relatively large variations in the strength of canceled signal B but cause very small relative changes in the strength of signal A. The ratio comparator 2 compares the strengths of signals A and B and the comparator 2 output signal CO is zero when the signal A strength exceeds the signal B strength by a large predetermined ratio, e.g., 20 dB. In practice, the ratio would be selectable for optimizing target detectability for a given clutter environment. For this invention, the strength of signal A for a stationary or slowly moving object establishes a level from which the threshold ratio (set by the ratio comparator 2) operates. Then, clutter suppressed output T is obtained when the strength of signal B causes the ratio of the strengths of signal A to signal B to be greater than a value established by the ratio comparator 2. It is therefore apparent that clutter is suppressed not on the basis of clutter strength, per se, but on the basis of its signal B level relative to its signal A level.

Figure 2:
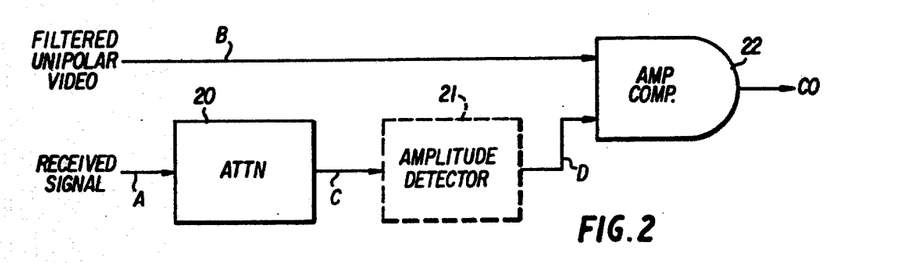
FIG. 2 is a block diagram that illustrates a ratio comparator which may be used in the suppressor of FIG. 1.

FIG. 2 shows a preferred embodiment for the ratio comparator 2 of FIG. 1. For specificity, it is assumed throughout this disclosure that filtered unipolar video signal B and unipolar video signal D are each of positive polarity. Then, since signals B and D are provided as the input signals to an amplitude comparator 22, both input signals are positive. The relative amplitude of signals B and D therefore provides a measure of the clutter attenuation provided by the doppler processor 1 (FIG. 1).

Again referring to FIG. 2, it will be noted that input signal A is attenuated by the attenuator 20 to provide signal C to the amplitude detector 21 which provides signal D to the amplitude comparator 22. Therefore, signal D is a unipolar video signal and its strength is proportional to signal A, and the signal A amplitude exceeds the signal D amplitude by a factor that is determined by the attenuator 20 and the transfer characteristics of amplitude detector 21. The amplitudes of signals B and D are compared using amplitude comparator 22 that provides a unit amplitude comparator output signal CO if the amplitude of signal B exceeds that of signal D; otherwise, signal CO is zero.

The operation of ratio comparator 2 as illustrated in FIG. 2 is to be further explained below. Let the relative strength of signals A and B be expressed in decibels (dB) and let the ratio, in decibels, by which signal A exceeds signal B be R(dB). Then, (a) Signal CO is of unit amplitude when $B > A - R(dB)$, and (b) Signal CO is zero when $B < A - R(dB)$.

It is therefore seen that attenuator 20 and detector 21 establish a ratio which is greater than unity and said ratio is the ratio by which the received signal A must exceed the filtered signal B if comparator output signal CO is zero. Otherwise, signal CO will be of unit amplitude. To clarify, let the ratio R(dB) be 20 dB. Then, (a) Signal CO will be zero if signal A exceeds signal B by more than 20 dB, and (b) Signal CO will be of unit amplitude if signal A exceeds signal B by less than 20 dB. It is therefore seen that, since the amplitude of signal D is proportional to the strength of received signal A and signal B is a doppler processed (filtered) signal, the ratio comparator output signal CO is provided only when the strength of received signal A exceeds the strength of filtered signal B by a ratio less than a predetermined value.

If signal A is a unipolar video signal, amplitude detector 21 is, in principle, unneccessary because its primary function is to convert an RF, IF or bipolar video signal to unipolar video. However, in some doppler processors signal B is obtained from the output of an analog amplitude detector. Since analog amplitude detectors have nonlinear input-output amplitude characteristics, the use of an amplitude detector 21 having the same amplitude characteristics as the detector used in the doppler processor is desirable so that the relative strength of signals B and D yields, independent of radar echo strength, a representative measure of the clutter attenuation that is provided by the doppler processor.

Figure 3:
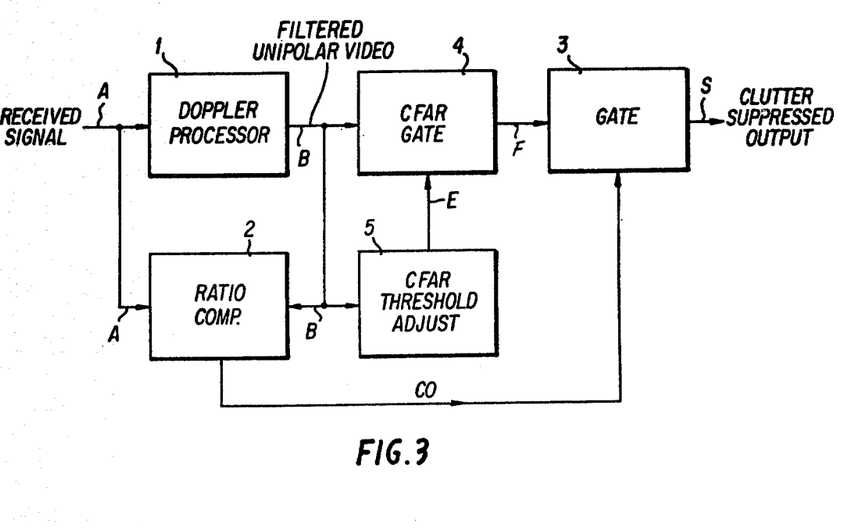
FIG. 3 is a block diagram that illustrates use of the basic suppressor invention in operative association with constant false alarm ratio circuitry.

FIG. 3 illustrates use of the invention in operative association with CFAR (constant false alarm ratio) circuitry. The conventional doppler radar with CFAR circuitry is comprised of the doppler processor 1 supplying unipolar video signal B to the CFAR circuitry that includes a CFAR gate 4 and a CFAR threshold adjust 5. The CFAR threshold adjust 5 compares signal B with an internally established threshold level. When signal B exceeds the given threshold level, the CFAR threshold adjust 5 provides signal E to the CFAR gate 4. Then, the CFAR gate 4 permits signal B to pass and thereby provides CFAR processed signal F.

For use of the invention in combination with the CFAR circuitry as illustrated in FIG. 3, the ratio comparator 2 and the gate 3 function as already described in connection with FIG. 1 with the exception that the gate 3 gates signal F for providing clutter suppressed output S.

The operation of FIG. 3 for rejecting clutter is now to be explained. Assume that the threshold level of the CFAR threshold adjust 5 has been optimally established for rejecting rapidly fluctuating clutter due,, e.g., to rain and for detecting moving targets of interest. Then, the attenuator 20 of FIG. 2 is set so that the gate 3 rejects signal F when due to "stationary" clutter and passes signal F when due to a target for providing clutter suppressed radar output S. Therefore, the invention suppresses the "stationary" clutter while permitting the CFAR circuitry to operate optimally for serving its role of rejecting "fluctuating" clutter and thereby improving the capability for detecting moving targets.

An alternative mode of combining CFAR circuitry and the basic suppressor invention is now clearly possible. Returning to FIG. 1, the clutter suppressed output T shown therein can be directly processed by CFAR circuitry. Then signal T of FIG. 1 would be supplied as the received input signal for the CFAR circuitry and the output of the CFAR circuitry could be supplied as the input signal for a a radar display.

Various forms of MTI, cw and pulse doppler radars are described in *Radar Design Principles*, McGraw-Hill Book Company, 1969, by F. E. Nathanson and *Introduction to Radar Systems*, McGraw-Hill Book Company, 1962 and 1980, by M. I. Skolnik.

Comments regarding MTI cancelers follow. A MTI canceler is a filter which purposefully provides high attenuation for a band of frequencies centered at the frequency corresponding to the doppler frequency for the relative velocity between the radar and a clutter source. The basic principle of MTI cancelers is delay and subtraction of received signals due to successive pulses from the radar transmitter. The delay-and-subtract circuitry is called the MTI canceler. Then, by comparing signals from successive transmit pulses, the signals due to echo that is unchanged (equal received signals) are canceled by the canceler. Therefore, in principle, the output from a MTI canceler is zero for echo from a stationary object. However, various factors including system instabilities cause the subtraction process to be incomplete. Modern MTI cancelers employ a number of delay and subtraction circuits, sometimes with feed-forward and feedback paths from one section to another, to provide shaping of the filter response. The canceler provides "canceled" signals that are both positive and negative and the MTI or doppler processor therefore comprises a means, such as a detector, rectifier or squarer, for converting the canceled signal to a signal of one polarity (unipolar video).

If both the radar and the clutter source is stationary, the echo frequency is the same as the transmit frequency. However, relative motion between the radar and the clutter source causes the radar echo frequency to be shifted by an amount (doppler frequency) which is proportional to the relative velocity. If the relative motion between the radar and the clutter is zero, i.e., zero doppler frequency, the MTI canceler (doppler processor 1) must suppress signals due to echoes with zero doppler frequency which can be accomplished with conventional MTI cancelers that attenuate signals of zero and nearly zero doppler frequency.

The relative velocity between a radar and a clutter source is not, however, always zero or nearly zero. For example, an aircraft radar moves rapidly relative to the ground and a wind blown rain can move with considerable speed relative to a stationary radar. Even under these conditions, some radars including those called airborne moving target indication (AMTI) radars, suppress clutter and retain targets on the basis of the relative doppler frequencies contained in the target and clutter signals.

The simplest MTI radar is of the amplitude processing type, and it compares only the amplitude of the echoes due to successive transmit pulses. Since the echo amplitude of stationary clutter is constant even if the radar moves relative to the clutter source, no special clutter suppression features are required for compensating for the motion of an envelope processing MTI radar. Unfortunately, for a single target to be detected with such a radar, clutter must be present so that an amplitude fluctuation is generated by the effect of constructive and destructive interference between the echoes of the target and of the clutter. This amplitude fluctuation is at a rate equal to the doppler frequency corresponding to the relative motion of the target and the clutter. Therefore, independent of radar motion, the amplitude of signal A of FIG. 1 will not change for stationary clutter but it will change at a doppler rate due to the relative motion between a target and clutter.

Figure 4:
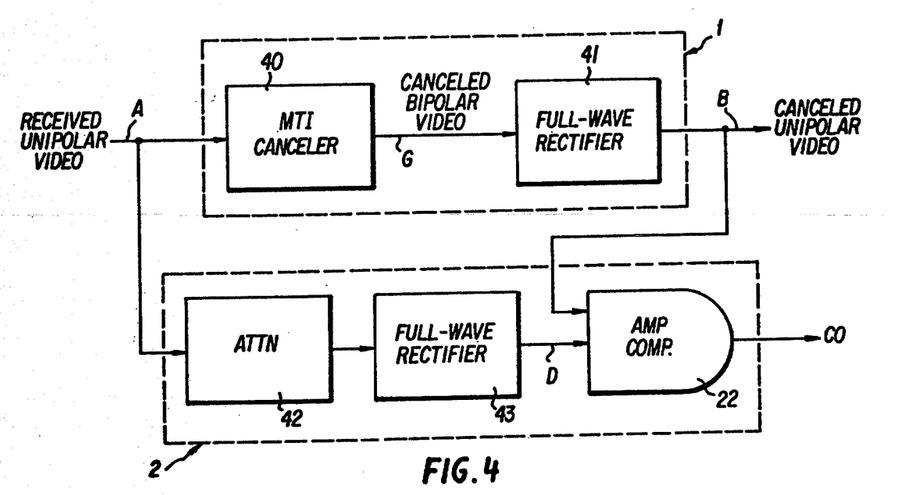
FIG. 4 is a block diagram that illustrates use of the basic suppressor invention in operative association with a MTI canceler for processing a unipolar video signal.

FIG. 4 illustrates use of the invention when used with an envelope detecting MTI radar.

Figure 5:
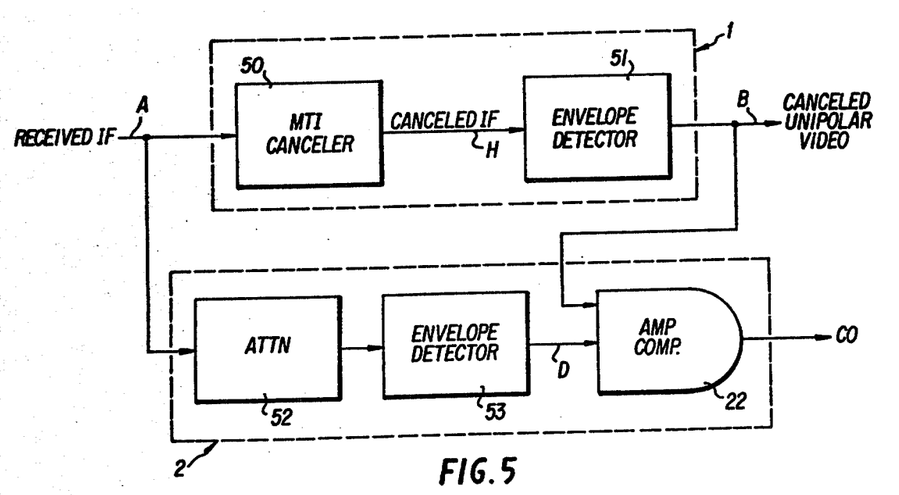
FIG. 5 is a block diagram that illustrates use of the basic suppressor invention in operative association with a MTI canceler for processing an IF signal and providing a canceled IF signal.
Figure 6:
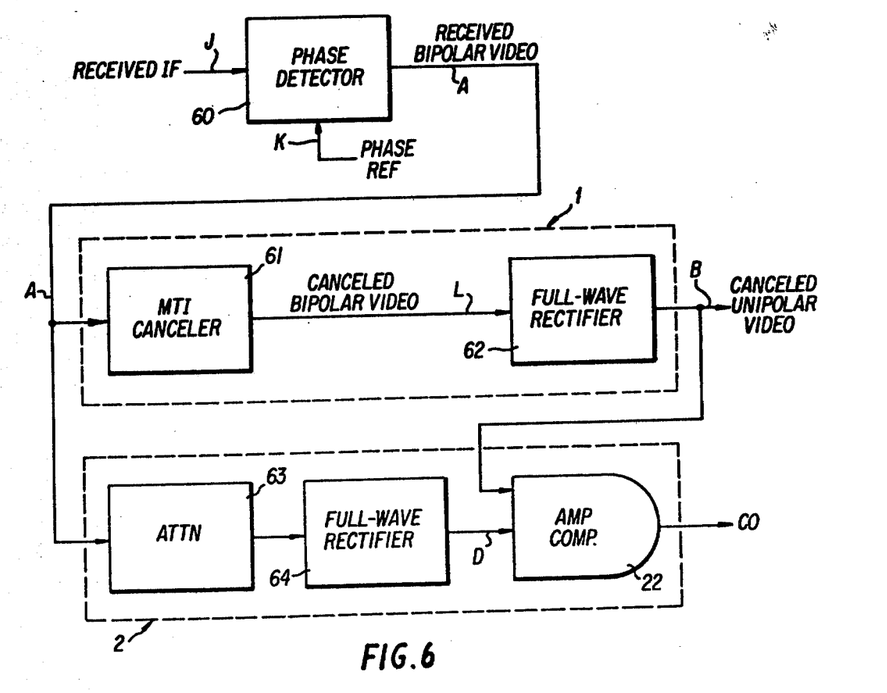
FIG. 6 is a block diagram that illustrates use of the basic suppressor invention in operative association with a MTI canceler for processing a bipolar video signal.
Figure 7:
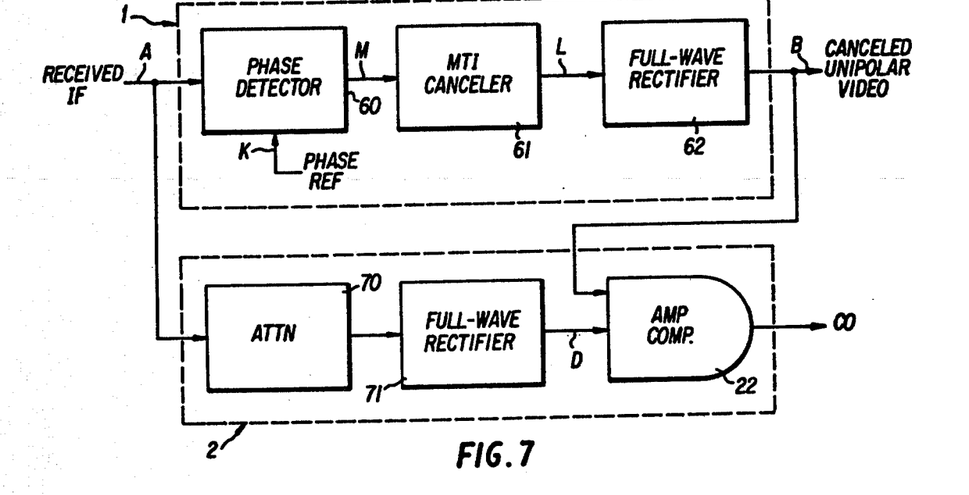
FIG. 7 is an alternative block diagram that illustrates use of the basic suppressor invention in operative association with a MTI canceler for processing a bipolar video signal.
Figure 8:
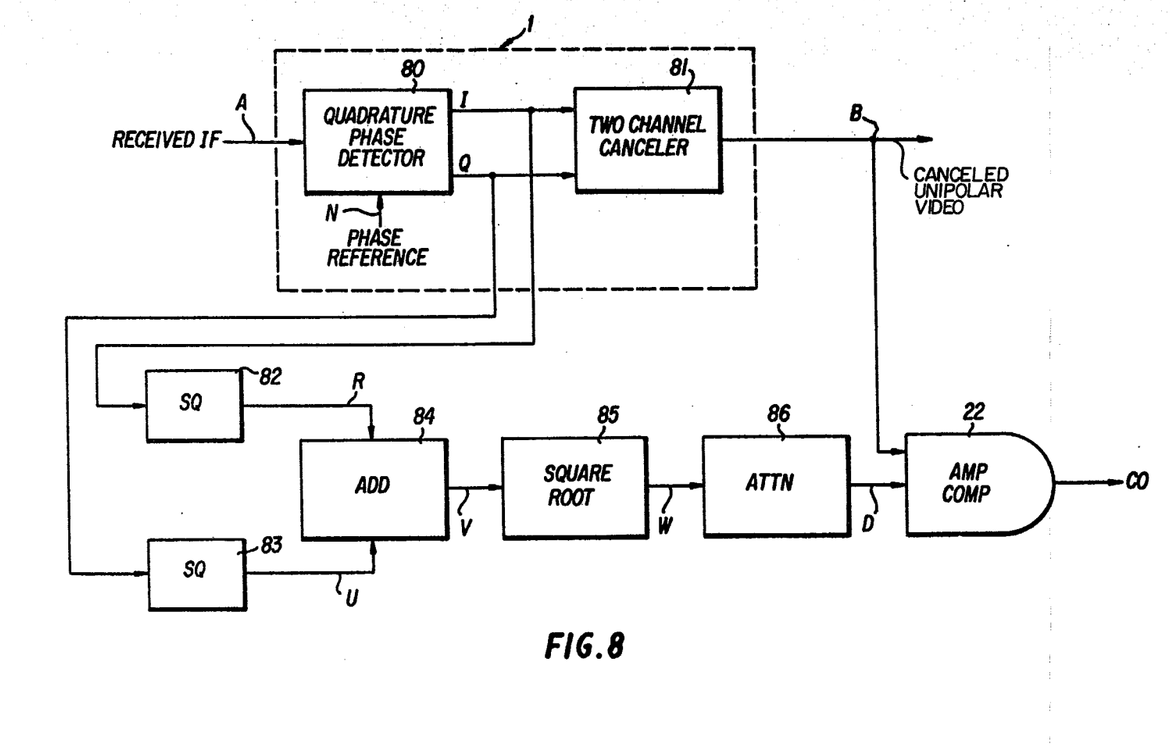
FIG. 8 is a block diagram that illustrates use of the basic suppressor invention in operative association with a two channel MTI canceler for processing in-phase and quadrature bipolar video signals.

FIG. 5 illustrates use of the invention when used with a so-called vector processing MTI radar, and FIGS. 6–8 illustrate use of the invention when used with phase processing MTI radars. Vector processing and phase processing radars do not require the presence of clutter for detecting a target. This is so because these radars sense the small difference (doppler frequency) between the transmit and the echo frequencies that is caused by the relative motion between the radar and the target. In other words, for a vector processing or a phase processing MTI radar, a relative motion between stationary clutter and the radar causes the frequency of signal A of FIG. 1 due to the clutter to be shifted by the doppler frequency. As now to be explained, to suppress clutter when there is relative motion between the radar and the source of clutter, special MTI circuitry is required for either a vector or phase processing radar.

Nathanson (1969, p. 327) shows in his FIG. 9-6 how clutter can be suppressed in a vector processing MTI radar when there is relative motion between the radar and the clutter source. In that implementation, a phase shifter is inserted in a circuit branch within the MTI canceler block 50 of FIG. 5 herein to minimize the relative phase between the delayed and th undelayed signals. In this way, the resulting phase shift compensates for the relative phase between echoes from successive transmit pulses that is caused by doppler shift in the echoes. Therefore, signals due to echo from clutter with non-zero doppler frequency are shifted in phase, within the MTI canceler 50, and are thereby highly attenuated by means of the subtraction process within the canceler. In other words, the MTI canceler performs as a band reject filter that selectively attenuates clutter signals with doppler frequencies that are within the reject band established by the inserted phase shift in association with the other components of the MTI canceler. Therefore, by use of an adjustable phase shifter, high attenuation can be provided for a band of doppler frequencies and the band center can be at zero, a positive or a negative frequency.

Skolnik (1962, p. 156) shows in his FIG. 4.44 how clutter can be suppressed in a phase processing MTI radar when there is relative motion between the radar and the clutter source. In that implementation, the reference signal (signal K of FIGS. 6 and 7 herein; signal N of FIG. 8 herein) is adjusted in frequency to compensate for the shift (doppler frequency) in the clutter echo frequency caused by the relative motion. The reference signal frequency change is made by means of a doppler frequency oscillator by mixing its signal with a signal of fixed frequency. Then, by adjusting the frequency of the doppler frequency oscillator so that it is the same as the doppler frequency of the clutter, the processors 1 of FIGS. 6–8 herein suppress clutter even though the clutter echo signals are shifted in frequency by the relative motion between the radar and the clutter. Therefore, high attenuation can be provided for a band of doppler frequencies and the band center can be at zero, a positive or a negative frequency.

From the foregoing discussion it should now be apparent that MTI methods and means that compensate for the relative velocity between the radar and the clutter source are a well-established part of the radar art. Means for compensating for relative radar-clutter velocity were described for the vector and phase processing radar types for which the doppler frequencies contained within the clutter signals can be zero, positive or negative. For these radar types, the clutter doppler frequency is proportional to the relative velocity between the radar and the clutter. Therefore, zero doppler frequency clutter occurs, e.g., if both the radar and the clutter are stationary. Since the sign of the relative velocity, and therefore the sign of the doppler frequency, depends on the directions of motion as well as the relative radar-clutter speed, a signal from stationary clutter can contain either positive or negative frequencies. Therefore, a basic MTI canceler that suppresses zero and near zero doppler frequencies operating in association with a relative velocity compensation means provides a band reject filter. Then, for suppressing clutter, this filter is adjusted by adjusting the relative radar-clutter velocity compensation means, so that the filter center frequency equals the doppler frequency corresponding to the relative velocity beteen the radar and the clutter. For an envelope processing radar, clutter is suppressed by attenuating doppler frequencies of zero and near zero. This is so because the envelope (amplitude) of echo for stationary clutter is unchanged by the relative motion between the radar and the clutter.

Block diagrams are to be discussed below of embodiments which use different canceler (doppler processor) types and which will generate the comparator output signal CO and operate in accordance with the foregoing descriptions of FIGS. 1, 2 and 3.

FIG. 4 illustrates a preferred embodiment of the present invention when used with an envelope processing MTI radar of the type described by Nathanson, pp. 323-325. The received unipolar video signal A is conventionally obtained from the output of an envelope (second) detector. Block 1 is a doppler processor 1 which is comprised of a MTI canceler 40 and a full wave rectifier 41. The MTI canceler 40 receives the uncanceled unipolar video signal A and provides canceled bipolar video signal G which is rectified by the full wave rectifier 41 for providing unipolar video signal B. The strengths of received signal A and canceled (filtered) signal B are compared using the ratio comparator 2 for providing ratio comparator output signal CO, as described in connection with FIG. 2. Ratio comparator 2 is comprised of the attenuator 42, the full wave rectifier 43, and the amplitude comparator 22. In the embodiment of FIG. 4, the rectifiers 41 and 43 are alike for providing amplitude detectors with matching amplitude response characteristics.

FIG. 5 illustrates a further preferred embodiment of the invention when used with a vector processing MTI radar of the type described by Nathanson, pp. 325-326. Received signal A is an IF signal. Block 1 is a doppler processor 1 which is comprised of a MTI canceler 50 and an envelope detector 51. The MTI canceler 50 receives the uncanceled IF signal A and provides a canceled IF signal H which is rectified by the envelope detector 51 for providing canceled (filtered) unipolar video signal B. Signals A and B are compared by the ratio comparator 2 for providing ratio comparator output signal CO, as described in connection with FIG. 2. The ratio comparator 2 is comprised of the attenuator 52, the envelope detector 53, and the amplitude comparator 22.

FIG. 6 illustrates an additional preferred embodiment of the invention when used with a phase processing MTI radar of the type described by Nathanson, pp. 320-323. The received bipolar video signal A is obtained from a phase detector 60 which has as inputs received IF signal J and phase reference signal K. Block 1 is a doppler processor 1 which is comprised of a MTI canceler 61 and full wave rectifier 62. The MTI canceler 61 receives uncanceled bipolar video signal A and provides canceled bipolar video signal L which is rectified by the full wave rectifier 62 to provide canceled (filtered) unipolar video signal B. Signals A and B are compared by means of the comparator 2 for providing ratio comparator output signal CO, as described in connection with FIG. 2. The ratio comparator 2 is comprised of the attenuator 63, the full wave rectifier 64, and the amplitude comparator 22.

FIG. 7 illustrates an alternative embodiment which is structurally somewhat similar to the FIG. 6 embodiment. It should be noted that the phase detector 60, the MTI canceler 61, and the full wave rectifier 62 are connected as in FIG. 6, and therefore signal B of FIG. 7 is the same as signal B of FIG. 6. However, in FIG. 7 signal D is obtained from a full wave rectifier 71 which rectifies received IF signal A, and FIG. 6 signal D is obtained from a full wave rectifier 62 which rectifies a bipolar video signal. To comply with the nomenclature of FIG. 1 wherein signal A is the input signal for doppler processor 1, in FIG. 7 the received IF signal is called signal A (but called signal J in FIG. 6) and the doppler processor 1 comprises a phase detector 60. As in the other embodiments of this disclosure, signals A and B are compared by means of the comparator 2 for providing ratio comparator output signal CO. In FIG. 7, the ratio comparator 2 is comprised of the attenuator 70, the full wave rectifier 71, and the amplitude comparator 22.

Digital delay devices (computer storage) are readily available today and therefore most modern MTI processors operate digitally. Since digital circuits process video signals, the doppler processor 1 and the ratio comparator 2 of both FIGS. 4 and 6 can be made to operate completely in digital format. Additionally, the ratio comparator and the two channel canceler that will now be described in connection with FIG. 8 can also be constructed for operating in digital format.

FIG. 8 illustrates yet another preferred embodiment of the invention when used with a two channel (I and Q) MTI processor of the type described in Skolnik, 1980 pp. 110-120. A two channel processor provides the advantage of eliminating the phase nulls resulting from blind phases that occur in single channel MTI cancelers and provides, on the average, a 3 dB improvement in target to clutter ratio (see, e.g., Nathanson, pp. 322-323). Block 1 is the doppler processor 1 which provides canceled (filtered) unipolar video signal B to the ratio comparator. In FIG. 8 received IF signal A is provided as input to a quadrature phase detector 80 which in combination with phase reference signal N provides both in-phase (I) and quadrature (Q) bipolar video signals. Following Skolnik, 1980, pp. 119-120, the two channel canceler 81 comprises a canceler and a respective squarer for processing each (I and Q) bipolar video signal, an adder for providing the sum of the squares of the processed I and Q signals, and a square rooter for providing the square root of the sum of the squares which is canceled (filtered) unipolar video signal B. Then, to provide signal W which is the amplitude of IF signal A, by processing only video signals, the bipolar video signals I and Q are respectively squared by respective squarers 82 and 83, the squared signals R and U are added in an adder 84 for providing signal V and square rooter 85 provides the square root of signal V which is signal W. Signal D is provided by attenuator 86 which attenuates signal W. Then, signals B and D are compared by means of the comparator 22 for providing ratio comparator output signal CO, as described in connection with FIG. 2. Since signal D in FIG. 8 is obtained by processing the I and Q signals, the ratio comparator 2 (see FIG. 1) is comprised of the quadrature phase detector 80, the squarers 82 and 83, the adder 84, the square rooter 85, the attenuator 86, and the amplitude comparator 22.

An alternative configuration that is sometimes used in two channel MTI processors for combining canceled I and Q signals simply adds the magnitudes (sign deleted) of the canceled I and Q signals. This simplication can also be used in the ratio comparator for combining the I and Q signals for obtaining signal W. Then, the ratio comparator 2 (see FIG. 1) would be comprised of the quadrature phase detector 80, a sign deleter for signal I and one for signal Q for providing magnitude I and magnitude Q, the adder 84 for providing signal W, the attenuator 86 for providing signal D, and the amplitude comparator 22.

While the embodiments shown in FIGS. 5-8 each show the reception of an IF signal, it is to be understood that a RF signal could be substituted in each case.

Figure 9:
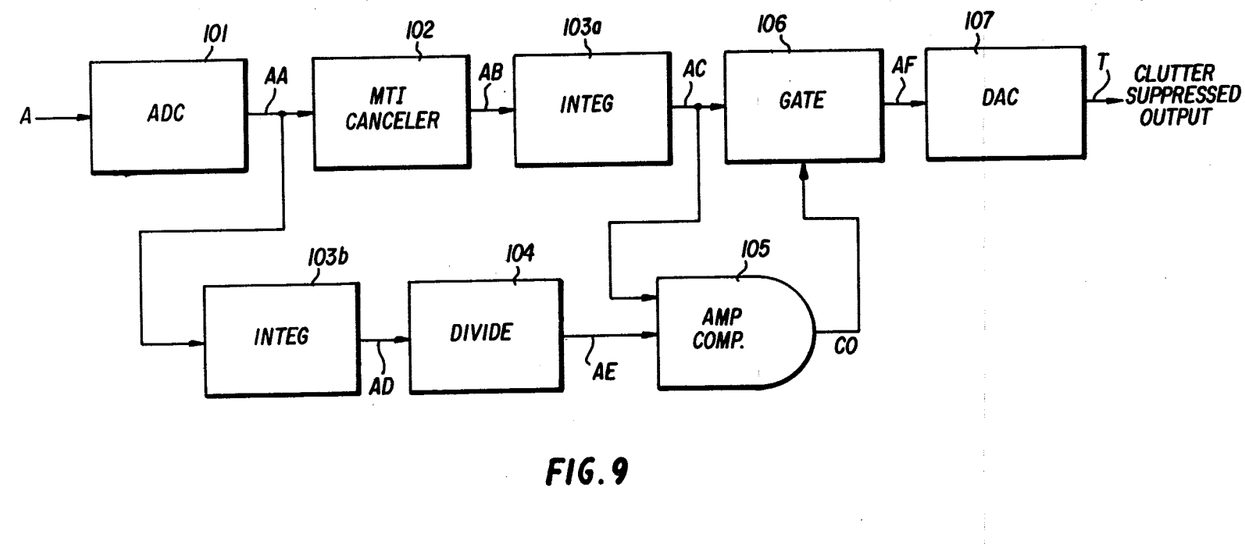
FIG. 9 is a block diagram that illustrates use of the basic clutter suppressor in operative association with delay-line integrators and a digital MTI canceler.

An integrator or lowpass filter can be used for providing an improved signal-to-noise ratio. In FIG. 9, integrator 103a is used to integrate signal AB for providing signal AC with an improved signal-to-noise ratio. Likewise, integrator 103b integrates signal AA for providing signal AD with an improved signal-to-noise ratio. Integrators 103a and 103b are delay-line integrators (lowpass filters) which automatically integrate, at each range, the radar signals of a pulse radar. For a description of delay-line integrators, see e.g., Skolnik, 1980 pp 390-391.

In FIG. 9, analog input signal A is converted to digitized signal AA by analog-to-digital converter 101 and digitized signal AF is transformed to analog signal T by digital-to-analog converter 107. For the sake of discussion, it has been assumed that the output signal AA of converter 101 in FIG. 9 is unipolar for providing a unipolar signal as input to integrator 103b. It is of course understood that signal AA may instead be bipolar; in that instance a sign deleter would be placed between the output of the converter 101 and the input of the integrator 103b. Likewise, even though MTI canceler 102 is comprised of subtracting circuitry that will provide bipolar signals, canceler output signal AB which is processed by integrator 103a is assumed to be provided without sign (sign delete) and signal AB is therefore a unipolar signal. As already noted, integrators 103a and 103b are lowpass filters used for filtering signals AA and AB and thereby providing integrated signals with improved signal-to-noise ratios.

In FIG. 9, received signal A can be either a unipolar or a bipolar video signal as in the examples of FIGS. 4 or 6, respectively. Analog-to-digital converter 101 converts analog signal A to digital signal AA which is processed by canceler 102 to provide MTI canceled (filtered) unipolar signal AB. Then, since signals AA and AB are unipolar signals the lowpass filters (integrators 103a and 103b) filter signals AB and AA for providing integrated signals AC and AD. Signal AD is attenuated by divider 104 to provide signal AE which is compared with signal AC by amplitude comparator 105. Comparator output signal CO exists only if the strength of signal AC exceeds the strength of signal AE, and gate 106 is gated on for providing signal AF from signal AC only if signal CO exists. Digital signal AF is converted to analog, clutter suppressed output signal T by digital-to-analog converter 107.

Figure 10:
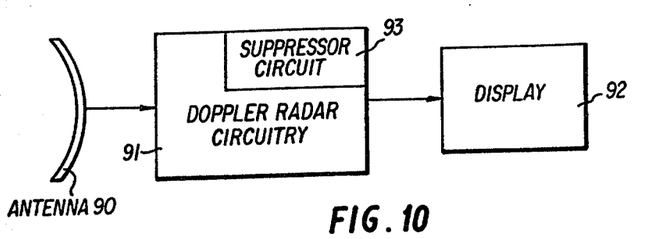
FIG. 10 is a simplified block diagram of a radar transmitter-receiver into which a radar clutter suppressor of the present invention may be incorporated.

FIG. 10 is a simplified block diagram of a doppler transmitter-receiver which may be modified to incorporate the suppressor circuits of the present invention further in accordance with the invention. As shown, the transmitter-receiver includes a conventional scanning or non-scanning antenna 90, conventional doppler radar circuitry 91 and a conventional display 92. Any one of the suppressor circuits of the present invention, as illustrated respectively in FIGS. 1, 3-8, 9, 12 and 14 shown generally as numeral 93, is incorporated appropriately into the circuitry 91. The transmitter may be a pulse or CW type.

Figure 11:
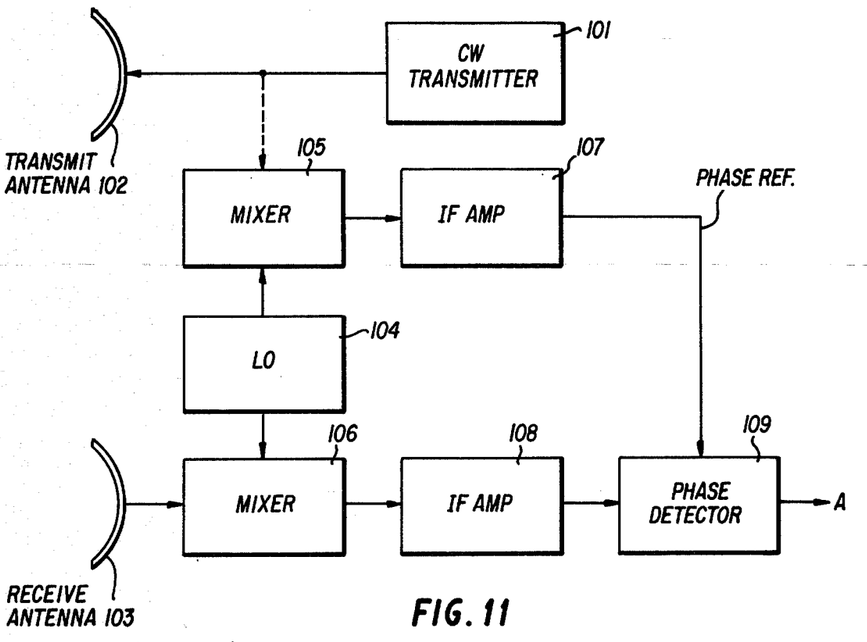
FIG. 11 is a block diagram of a cw doppler transmitter-receiver and a phase detector for providing bipolar video doppler signals for cw doppler radar.
Figure 12:
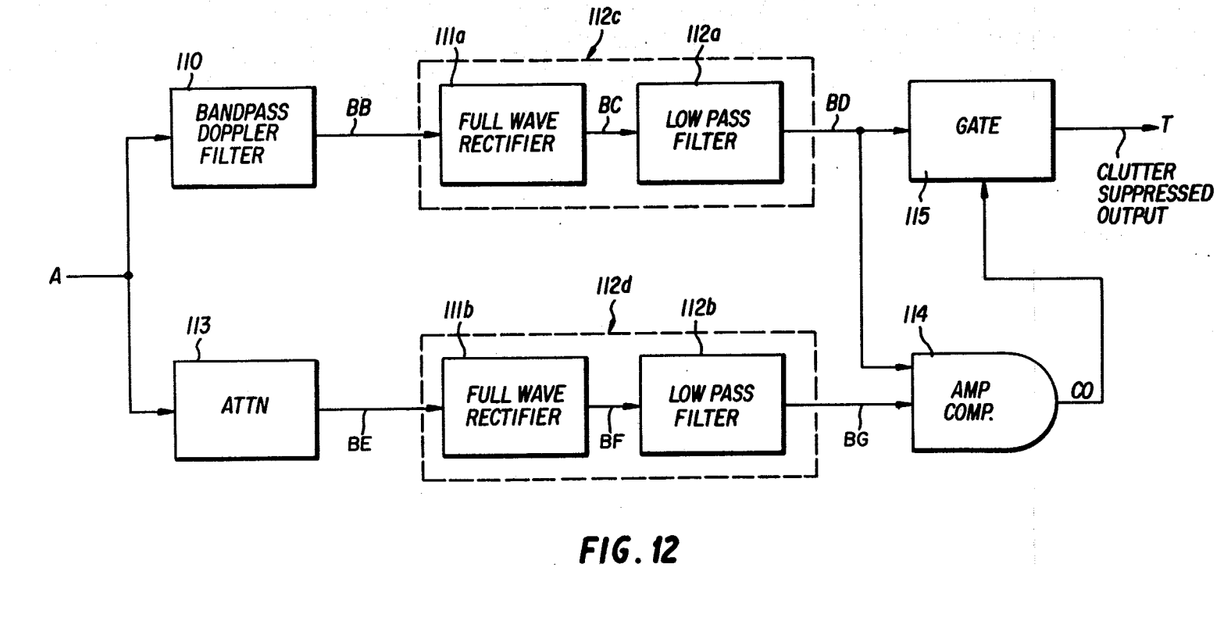
FIG. 12 is a block diagram that illustrates use of the basic clutter suppressor invention in operative association with a doppler processor using a bandpass filter.

FIG. 11 is a block diagram of a cw (continuous wave) doppler transmitter-receiver and a phase detector for providing bipolar video signals for further processing with the embodiment of FIG. 12. Transmitter 101 supplies continuous waves to transmit antenna 102, and receive antenna 103 receives radar echoes of the transmitter waves that are radiated by antenna 102. Antennas 102 and 103 can be co-located for providing monostatic radar performance, or antennas 102 and 103 can be widely separated for providing bistatic radar performance.

In FIG. 11, local oscillator 104 is the local oscillator for the radar receiver and it provides signals to mixers 105 and 106. A reference sample of the transmitter 101 waves is also supplied to mixer 105 via cabling or a microwave link. Radar echoes are received by antenna 103 and supplied to mixer 106. IF amplifier 107 amplifies the difference frequency signal of the signals supplied to mixer 105 and IF amplifier 108 amplifies the difference frequency signal of the signals supplied to mixer 106, and the outputs of amplifiers 107 and 108 are supplies as inputs to phase detectors 109. The signal from amplifier 107 serves as the phase reference for phase detector 109. Generally, the input signals for detector 109 will differ in frequency because of target motion. Therefore signal A, the output of phase detector 108, will have doppler frequency components caused by a moving target.

The principles of operation for cw doppler radars are given in Chap. 3 of Skolnik (1980). Basically, a narrow-band filter which is tuned to the doppler frequency of the target is used to reject clutter. This is accomplished (a) by using a single tuneable filter (called a speed gate) that tracks the target doppler frequency or (b) by using bank of narrow-band filters with overlapping passbands.

FIG. 12 illustrates use of the basic invention in operative association with a doppler processor for cw radar. The doppler processor is comprised of a speed gate as represented by bandpass doppler filter 110. Received signal A, which contains doppler frequency components due to target motion, is provided as input to bandpass doppler filter 110 which provides filtered signal BB which in turn is fed to integrator 112c which includes a full wave rectifier 111a followed by a lowpass filter 112a. The signal BB is rectified by the full wave rectifier 111a for providing unipolar video signal BC. Signal BC is supplied to lowpass filter 112a for providing signal BD that has a signal-to-noise ratio which is larger than that of signal BC. Therefore, the filtered signal BD is obtained from received signal A through use of a filter comprised of bandpass filter 110 and lowpass filter 112a.

In FIG. 12, application of the subject invention is accomplished by comparing the strengths of signals BD and reference signal BG with amplitude comparator 114 for providing comparator output signal CO. Signal BG is obtained by attenuating received signal A with attenuator 113 for providing signal BE, by rectifying signal BE with full-wave rectifier 111b for providing signal BF, and by integrating signal BF with lowpass filter 112b. The rectifier 111b and lowpass filter 112b compose an integrator 112d. Comparator output signal CO will exist only if the strength of filtered signal BD exceeds the strength of reference signal BG and gate 115 will be gated on only if signal CO exists, thereby providing clutter suppressed radar output signal T.

For persons familiar with the radar art, it will be apparent that all radar applications do not require the use of lowpass filter (integrators) 112a and 112b. Then, signals BC and BF would be compared with amplitude comparator 114 and signal CO would cause gate 115 to either pass or reject signal BC.

The operation of FIG. 12 for rejecting clutter and passing target signals will now be explained. Assume for signal A that (1) the doppler frequency for a desired target is within the pass band of bandpass filter 110 and (2) the doppler frequency for clutter is outside that pass band. Without a desired target present the ratio of strengths of signals BD and BG will be small but not zero because a filter cannot provide infinite attenuation to an out-of-band signal. Thus, if signal A due to clutter is very large, the strength of signal BD due to clutter may be sufficiently large so as to be troublesome. Therefore, to prohibit the troublesome clutter signal BD from reaching the radar output, attenuator 113 is set so that signal CO is zero and gate 115 rejects signal BD. Then, if a sufficiently strong signal from a desired target is present, the signal BD strength will be increased substantially because the target doppler frequency is within the pass band of filter 110. The aforementioned signal increase causes an increase in the strength of signal BD relative to signal BG, and therefore signal CO opens gate 115 so that signal BD now contributes to the radar output T. Thus it is seen that for clutter only gate 115 prohibits signal BD from contributing to the radar output signal T, but with a desired target plus clutter gate 115 will permit signal BD to contribute to the radar output T. It is therefore apparent that signal T is clutter suppressed radar output.

Pulse radar will provide target range information which cannot be provided by cw doppler radar. For pulse radar that uses doppler filtering, ambiguity can exist in either the range data or the doppler data. A pulse radar that uses doppler filtering is called either a MTI or a pulse doppler radar and, according to Skolnik (1980, p. 139), the distinction arises because of the aforementioned range and doppler ambiguities. If for the instrumented radar range there is no range ambiguity, a doppler radar is called a MTI radar. On the other hand, if there are range ambiguities in the instrumented range, the radar is (following the definition of Skolnik) called a pulse doppler radar.

Block diagrams for MTI and pulse doppler radars can be identical. For a sufficiently low pulse repetition frequency (prf) there will be no range ambiguity within the instrumented radar range and therefore a MTI radar will usually have a low prf, and a pulse doppler radar will usually have a high prf. Since the distinction between the two radar types is based on the relationship of prf to instrumented radar range, the discussions and block diagrams for pulse radar within this disclosure are applicable to either MTI or pulse doppler radars. For example, consistent with ordinary practive the cancelers described herein are called MTI cancelers, but the radar itself might, according to Skolnik's definition, be a pulse doppler radar because range ambiguities might exist within the instrumented radar range. In the radar literature, MTI cancelers are also called delay-line cancelers. Also, some authors restrict the definition of pulse doppler radar to include only those radars having a bank of doppler filters.

Figure 13:
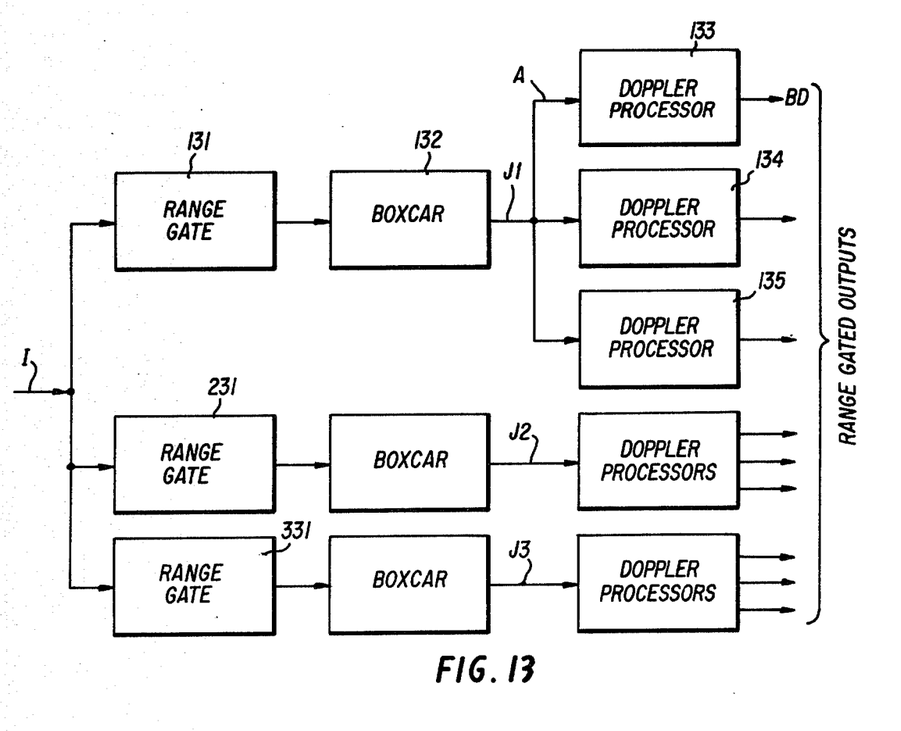
FIG. 13 is a block diagram of a range-gated MTI or range-gated pulse doppler processor.

FIG. 13 illustrates a processor for either a range-gated MTI or a range-gated pulse doppler radar. These radar types are described by Skolnik (1980) on pages 117–119, 139 and 140. Through use of range gates and boxcar generators, range-gated MTI and pulse doppler radars transform received signal I into signals (J1, J2, and J3 in FIG. 13) associated with different range intervals. For a MTI radar, there is one range gate and one boxcar generator, e.g., blocks 131 and 132 respectively, for each range interval within the instrumented radar range, and for pulse doppler range each range gate and boxcar generator, e.g., blocks 131 and 132 respectively, usually pass received signals from a plurality of range intervals. For a MTI radar, there is usually only one doppler processor, e.g., block 133, which is comprised of a bandpass filter, for each range gate, e.g., block 131, which thereby provides a signal, e.g. signal BD, for a specific range interval. For a pulse doppler radar, there are a plurality of doppler processors, e.g., blocks 133, 134, and 135, for each range gate (e.g., block 131); ordinarily, each doppler processor for a given range gate is comprised of a bandpass filter wherein the filter for each processor (133, etc.) is tuned to a different center frequency.

The basic clutter suppressor invention can be used in operative association with each doppler processor (133, etc.) of a range-gated MTI or a pulse doppler radar, as will now be explained by reference to FIG. 12. Let doppler processor 133 of FIG. 13 that processes signal A and provides signal BD be comprised of bandpass doppler filter 110, full wave rectifier 111a and lowpass 112a of FIG. 12. Then, as previously explained in connection with FIG. 12, the basic clutter suppressor invention can be used with the doppler processor comprised of a bandpass filter 110 for providing a clutter suppressed radar output T. Since each doppler processor can be structurally similar, it has now been explained how, through use of the basic invention, a clutter suppressed output can be obtained for each doppler processor (133, 134, 135, etc.) of the range-gated MTI or pulse doppler radar illustrated by FIG. 13.

Figure 14:
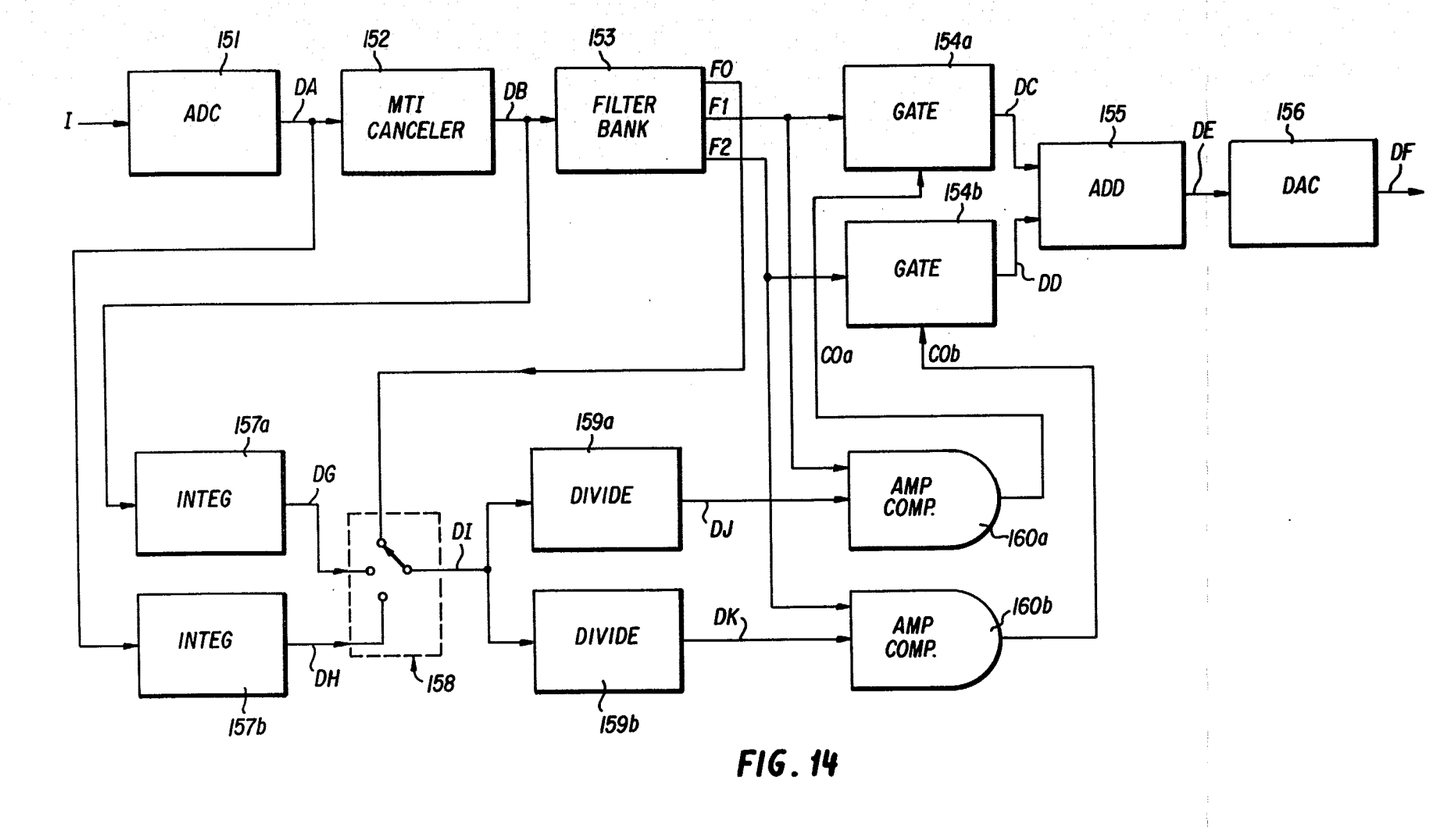
FIG. 14 is a block diagram that illustrates use of the basic clutter suppressor invention in operative association with a doppler processor comprising a bank of time dependent doppler filters.

Pulse doppler radars are generally comprised of a bank or banks of filters tuned to different frequencies. However, a bank of bandpass filters can also be used effectively as the doppler processor for MTI radar. Additionally, the bank of filters can be cascaded with a delay-line canceler (MTI canceler) for providing greater suppression of stationary or slowly moving clutter than can be obtained with either the canceler or the filter bank alone. FIG. 14 illustrates a doppler processor that comprises a doppler filter bank (block 153) cascaded with a MTI canceler (block 152).

A transversal doppler filter can be used to provide a doppler filter bank comprised of time dependent filters for filtering signals from all radar ranges. As explained by Skolnik (1980, pp 121–123), a digital transversal doppler filter bank can simultaneously process N pulses and provide N filter outputs with N different center frequencies. One of the N center frequencies is, however, zero frequency and this output is therefore not used for providing the doppler signal from a moving target. As already noted, doppler filter banks can be constructed so as to have many different filter pass bands, each with a different center frequency. Since one filter is tuned to zero frequency, the filter bank that processes N pulses is comprised of one lowpass filter and N-1 bandpass filters. An advantage of using bandpass filters is that a signal from a moving target that is in a given filter pass band must, for detection, compete only with spurious signals that are in the given pass band. The FFT (fast Fourier transform) filter bank, commonly used for providing a doppler filter bank, is a transversal, time dependent filter.

For FIG. 14, the input signal I can be either a unipolar or a bipolar doppler signal. Alternatively, for eliminating blind phases that occur in single channel processors, two phase detector signals in quadrature, e.g., I and Q of quadrature phase detector 80 of FIG. 8, can be separately processed and combined. In that case, the I signal and the Q signal would each be processed by a circuit as illustrated in FIG. 14 for providing an output signal DF for each input (I and Q). The two DF outputs can be combined by the combining means described in connection with FIG. 8 for combining the signals I and Q therein for providing signal W.

In FIG. 14, the doppler processor is comprised of digital MTI canceler 152 and doppler filter bank 153, a digital transversal filter. Thus, the analog signal I is converted to signal DA in digital format by analog-to-digital converter 151, signal DA is processed by MTI canceler 152 for providing clutter suppressed signal DB and signal DB is processed by digital filter bank 153 for providing three signals F0, F1, and F2.

As was the case for FIG. 9, for the sake of discussion it is assumed that the analog-to-digtal output signal and the canceler output signal (signals DA and DB of FIG. 14) are unipolar signals. Also, it is assumed that signals F0, F1 and F2 are unipolar signals. It is of course understood that digital signals are readily changed from bipolar to unipolar by sign deletion.

Signal F0 contains doppler frequency components of zero and near zero frequency and therefore signal F0 is provided by a lowpass filter. Also, signals F1 and F2 each may contain a band of doppler frequencies wherein the center of the F1 band is greater than zero frequency and the center of the F2 band is greater than the center of the F1 band. Therefore, signals F1 and F2 are each provided by bandpass filters having different center frequencies.

The operation of the doppler processor will now be explained. Canceler 152 supplies signal DB as output by providing high attenuation to signal DA if due to a fixed or slowly moving object and provides much less attenuation, on-the-average, for signal DA if due to a rapidly moving target. Filter bank 153 processes signal DB and provides these signals: F0, F1 and F2. Signal F0 is due to fixed or slowly moving objects and signals F1 and F2 are due principally to move rapidly moving objects. For specificity, assume a moving target causes signal F1 to exist, and assume there is no clutter. Then, signal F1 will be somewhat smaller than signals DA and DB but it will be much larger than signals F0 and F2. Now, if a fixed clutter signal is added, signals DA, DB and F0 will increase relative to the strength of signal F1. Finally, if there is not a signal F1 due to a target, the strengths of signals DA, DB and F0 will be very much larger than the strength signal F1. If signal F2 instead of F1 exists due to a moving target, the strength of signal F2 instead of signal F1 varies relative to signals DA, DB and F0 as described above.

In FIG. 14, signals F1 and F2 are gated on and off by gates 154a and 154b for providing signals DC and DD, respectively. Signals DC and DD are added in adder 155 for providing signal DE, and signal DE which is in digital format is supplied to digital-to-analog converter 156 for conversion to analog, clutter suppressed signal DF.

It will now be explained how gates 154a and 154b are gated for providing clutter suppressed radar output. Switch 158 of FIG. 14 is used for selecting an input signal DI which, when attenuated by dividers 159a and 159b, provides signals DJ and DK for amplitude comparators 160a and 160b. Signal DI can be either signal F0, signal DG or signal DH. Then with switch 158 in the up position, amplitude comparator 160a compares the strengths of signals F0 and F1 and amplitude comparator 160b compares the strengths of signals F0 and F2. Similarly, for the mid position of switch 158, signals DG and F1 and DG and F2 are compared by comparators 160a and 160b, respectively. Finally, for the down position of switch 158, signals DH and F1 and DH and F2 are compared by comparators 160a and 160b, respectively. In FIG. 14, amplitude comparator 160a provides an output signal COa of two levels and of a level sufficient to gate-on gate 154a only if the ratio of the strength of signal F1 to the strength of signal DI is greater than a first predetermined value. Similarly, comparator 160b will provide an output signal COb that will gate-on gate 154b only if the ratio of the strength of signal F2 to the strength of signal DI is greater than a second predetermined value. Signal DI is selectable so that is can be either DG, DH or F0.

In FIG. 14, integrators 157a and 157b integrate signals DA and DB for providing signals DG and DH, respectively, with lower noise levels. It will be apparent to persons familiar with radar signal processing that integrators 157a and 157b will not always be necessary; yet, for some applications it may be desirable to integrate signal F0 for providing a signal DI with a lower noise level. However, it should be recalled that filter bank 153 is comprised of a lowpass filter that provides signal F0. Therefore, since a lowpass filter functions as an integrator, the noise power of signal F0 is less than that of either signal DA or signal DB. It should now be apparent that filter bank 153 is a doppler processor that filters its received signal DB and thereby provides bandpass filtered signals F1 and F2 and lowpass filtered (integrated) signal F0.

It will now be explained how signal F1 can be compared with signal DA signal DB or signal F0 and signal F2 can be compared with signal DA, signal DB or signal F0 for providing clutter suppressed radar output signal DF. As already noted the ratios of strengths of the signals DA to F1, DA to F2, DB to F1, DB to F2, F0 to F1, and F0 to F2 are relatively large with only clutter signals present and relatively small with only target signals present. Therefore, since signal COa from comparator 160a gates-on gate 154a and signal COb from comparator 160b gates-on gate 154b only if an aforementioned ratio is less than a predetermined value, it should now be apparent that the addition of signals DC and DD in adder 155 will provide a clutter suppressed signal DE in digital format, and that digital-to-analog converter 156 converts signal DE to analog signal DF which provides a clutter suppressed radar output.

In FIG. 14 canceler 152 is cascaded with filter bank 153 to provide additional attenuation for signals from fixed and slowly moving objects. Obviously, for some applications canceler 152 is unnecessary. With canceler 152 eliminated, signals DA and DB will be the same signals and the mid and lower positions of switch 158 will be redundant.

FIGS. 9, 12 and 14 illustrate embodiments of the invention that use integrators for reducing signal fluctuations caused by system noise. As will now be explained, the integrators will also reduce the effects of clutter fluctuations caused by a radar antenna beam that scans across a rough land or sea surface area. When an antenna beam moves across such an area, a naturally rough land or sea surface will cause the radar echo to be comprised of randomly generated doppler frequency components; therefore, the received signal A and the doppler filtered signal B of FIG. 1 will each fluctuate randomly as the antenna beam of a ground-based radar is scanned in azimuth or as the antenna beam of an airborne radar is scanned due to an aircraft or a missile flight pattern.

The rate of clutter fluctuation due to scanning depends on the rate at which the antenna beam center is scanned through an angle equal to the antenna beamwidth. For example, experience indicates that clutter echoes from two beam directions are unpredictably related if the beam directions are separated by an angle equal to the antenna half-power beamwidth. Therefore, the fluctuations in either signal A or signal B will be substantially reduced by integrating either signal A or signal B, respectively, over the time required for the beam to move through a half-power beamwidth. As an example, assume that FIG. 9 is used with a pulse radar that scans in azimuth and transmits and receives at a rate of 20 pulses per antenna beamwidth. Then, for this example, the fluctuations in signals AA and AB due to antenna scanning will be substantially removed from signals AC and AD if integrators 103a and 103b each continuously integrates the last 20 pulses from each radar range.

The importance of minimizing erractic amplitude fluctuations due to system noise or antenna scanning in signals that are being compared cannot be overemphasized. Returning to FIG. 1, recall that signal CO, which causes a radar output signal to be passed or rejected, is generated on the basis of the relative strength of signals A and B. It is thus important to compare signals that do not fluctuate erratically. For examples of using integrators that will minimize the effect of system noise or antenna scanning on the ratio of two signals being compared, the reader is referred to integrators 103a and 103b of FIG. 9, integrators 112c and 112d of FIG. 12, and integrators 157a and 157b of FIG. 14.

In each of the above-mentioned examples, noncoherent integration is accomplished by supplying unipolar video signals to lowpass filters. For FIGS. 9 and 14 the inputs to the lowpass filters (integrators 103a, 103b, 157a, 157b) are in digital format with signs deleted and are therefore unipolar video signals. For FIG. 12 the full wave rectifiers 111a and 111b are provided for converting bipolar video signals BB and BE to unipolar video signals that are respectively integrated by lowpass filters 112a and 112b.

In designing clutter suppressors which employ applicant's basic clutter suppressor invention the signal processing practice of compensating for relative signal delays with delay lines will sometimes be necessary. For example, the basic invention simultaneously compares the strengths of two signals obtained by separately processing a received signal through two channels and then if the signal transit times are equal for the two channels, the two signals will be simultaneously responsive to the echo from each radar target. Therefore, depending on the relative transit time, it may be necessary to add delay means, such as a delay line, in one of the channels for equalizing the transit times. For example, in FIG. 12 the two channels differ in that one comprises a bandpass filter 110 and the other comprises attenuator 113. Since the transit time for a bandpass filter can be non-negligible and will exceed that of an attenuator, signals BD and BG can be provided equal transit times by delaying signal BG with a delay line connected between integrator 112d and comparator 114.

The above described embodiments of a radar clutter suppressor, which are illustrated in FIGS. 1, 3-8, 9 and 12-14, may be used in practicing the method of suppressing radar clutter accordance with the present invention. The method comprises the steps of providing a received signal with doppler frequency components in response to radar echoes of radar transmitted waves, providing a filter signal by a step that includes selectively attenuating the doppler frequency components of said received signal, comparing strengths of said filtered signal with said received signal or with said received signal when integrated or with said received signal when filtered by lowpass filtering, providing a comparator output signal of a first level only when a ratio of said compared strengths is within a first predetermined range of values and of a second level whenever said ratio is outside said predetermined range of values, and gating a signal in response to the comparator output signal to provide a gated signal constituting a clutter suppressed radar output only when the ratio of said filtered signal to said received signal or said received signal when integrated or said received signal when filtered by lowpass filtering exceeds a predetermined value.

The method of suppressing clutter may include providing a unipolar video signal, a bipolar video signal, an IF signal or a RF signal as the received signal.

The method of suppressing clutter may additionally include gating said filtered signal for providing said gated signal.

The method of suppressing clutter may additionally include providing radar transmitter waves that are continuous waves or providing pulsed radar transmitter waves.

The method of suppressing clutter may additionally include producing the filtered signal by providing high attenuation for a band of doppler frequencies, said band being centered at either zero doppler frequency or at a positive or negative doppler frequency.

The method of suppressing clutter may additionally include producing the filtered signal by providing bandpass filtering for providing minimum attenuation for a band of doppler frequency components wherein said band is not centered at zero frequency.

The method of suppressing clutter may additionally include producing the filtered signal by providing a filtered signal that has been integrated.

It is to be understood that the illustrative embodiments discussed above and illustrated in the accompanying drawings have been set out by way of example, not by way of limitation. Numerous other embodiments and variants are possible without departing from the spirit and scope of the invention, its scope being defined by the appended claims.

I claim:

1. A radar clutter suppressor comprising:
   receiving means for receiving radar echoes of radar transmitter waves and for providing a received signal with doppler frequency components in response to said radar echoes;
   signal processing means having doppler processor means for frequency filtering the received signal to selectively attenuate the doppler frequency components of the received signal and provide at least one filtered signal in response to the received signal;
   amplitude comparison means for comparing the at least one filtered signal and the received signal and for providing a comparator output signal of a first level only when a ratio of the strengths of the at least one filtered signal and the received signal is within a predetermined range of values and of a second level whenever the ratio is outside the predetermined range of values; and
   gating means responsive to the comparator output signal for selectively passing a radar output signal constituting a clutter suppressed radar output only when the ratio of the at least one filtered signal to the received signal exceeds a predetermined value.

2. A radar clutter suppressor comprising:
   receiving means for receiving radar echoes of radar transmitter waves and for providing a received signal with doppler frequency components in response to said radar echoes;
   signal processing means having a doppler processor for frequency filtering the received signal to selectively attenuate the doppler frequency components of the received signal and provide at least one filtered signal in response to the received signal;
   integrating means for providing a reference signal in response to the received signal;
   amplitude comparison means for comparing the at least one filtered signal and the reference signal to provide a comparator output signal of a first level only when a ratio of the strengths of the at least one filtered signal and the reference signal is within a predetermined range of values and of a second level whenever the ratio is outside the predetermined range of values; and
   gating means responsive to said comparator output signal for selectively passing a radar output signal constituting a clutter suppressed radar output only when the ratio of the at least one filtered signal to the reference signal exceeds a predetermined value.

3. A radar clutter suppressor according to claim 1 or claim 2, wherein said gating means selectively passes the at least one filtered signal.

4. A radar clutter suppressor according to claim 1 or claim 2, wherein the transmitter waves are continuous waves.

5. A radar clutter suppressor according to claim 1 or claim 2, wherein the transmitter waves are pulsed waves.

6. A radar clutter suppressor according to claim 1 or claim 2, wherein said signal processing means includes CFAR circuitry.

7. A radar clutter suppressor according to claim 1 or claim 2, wherein said doppler processor is comprised of a MTI canceler.

8. A radar clutter suppressor according to claim 1 or claim 2, wherein said doppler processor is comprised of at least one bandpass filter.

9. A radar clutter suppressor according to claim 2, wherein said doppler processor is comprised of a transversal time dependent filter bank and said integrating means is a zero frequency filter of said filter bank.

10. A radar clutter suppressor according to claim 1 or claim 2, wherein said doppler processor includes a MTI canceler and at least one bandpass filter.

11. A radar clutter suppressor according to claim 1 or claim 2, wherein said signal processing means is comprised of integrating means.

12. A radar clutter suppressor according to claim 1 or claim 2, wherein said signal processing means is comprised of lowpass filter means.

13. A radar clutter suppressor according to claim 1 or claim 2, wherein said receiving means includes a scanning antenna.

14. A method of suppressing radar clutter comprising the steps of:
    providing a received signal with doppler frequency components in response to radar echoes of radar transmitted waves;
    providing at least one filtered signal by a step that includes selectively attenuating the doppler frequency components of said received signal;
    comparing strengths of the said received signal and said at least one filtered signal and providing a comparator output signal of a first level only when a ratio of said strengths is within a first predetermined range of values and of a second level whenever said ratio is outside said predetermined range of values; and
    gating a signal in response to the comparator output signal to provide a gated signal constituting a clutter suppressed radar output only when the ratio of said filtered signal to said received signal exceeds a predetermined value.

15. A method of suppressing radar clutter comprising the steps of:
    providing a received signal with doppler frequency components in response to radar echoes of radar transmitted waves;
    providing at least one filtered signal by a step that includes selectively attenuating the doppler frequency components of said received signal;
    integrating said received signal for providing a reference signal;
    comparing strengths of the said reference signal and said at least one filtered signal and providing a comparator output signal of a first level only when a ratio of said strengths is within a first predetermined range of values and of a second level whenever said ratio is outside said predetermined range of values; and gating a signal in response to the comparator output signal to provide a gated signal constituting a clutter suppressed radar output only when the ratio of said at least one filtered signal to said reference signal exceeds a predetermined value.

16. A method of suppressing radar clutter according to claim 14 or claim 15, wherein said gated signal is said at least one filtered signal.

17. A method of suppressing radar clutter according to claim 14 or claim 15, wherein said waves from said radar transmitter are continuous waves.

18. A method of suppressing radar clutter according to claim 14 or claim 15, wherein said waves from said radar transmitter are pulsed waves.

19. A method of suppressing radar clutter according to claim 14 or claim 15, wherein the step of providing at least one filtered signal includes band reject filtering for providing maximum attenuation for a band of doppler frequency components of said received signal, said band centered at zero frequency.

20. A method of suppressing radar clutter according to claim 14 or claim 15, wherein the step of providing at least one filtered signal includes band reject filtering for providing maximum attenuation for a band of doppler frequency components of said received signal, said band centered at a positive or a negative frequency.

21. A method of suppressing radar clutter according to claim 14 or claim 15, wherein the step of providing at least one filtered signal includes bandpass filtering for providing minimum attenuation for a band of doppler frequency components of said received signal, said band not centered at zero frequency.

22. A method of suppressing radar clutter according to claim 14 or claim 15, wherein the step of providing at least one filtered signal includes integrating said one of said at least one filtered signal.

23. A method of suppressing radar clutter according to claim 14 or claim 15, wherein the step of providing a received signal including scanning the beam of a radar antenna for providing a directional response to the radar echoes of the radar transmitted waves.

24. A radar clutter suppressor comprising:
MTI Processor means for processing a received signal to provide a MTI canceled signal;
a ratio comparator means for comparing strengths of the received signal and the canceled signal to provide a comparator output signal only when a ratio of strengths of the signals exceeds a predetermined value, said ratio comparator means consisting of an attenuator operatively arranged to pass and to attenuate the received signal and an amplitude comparator operatively arranged to receive the canceled signal and output from said attenuator; and
a signal processing means including a gate responsive to the comparator output signal for selectively passing the canceled signal whenever the comparator output signal is present, thereby providing clutter suppressed radar output.

25. A radar clutter suppressor comprising:
MTI processor means for processing a received signal to provide a MTI canceled signal;
a ratio comparator means for comparing strengths of the received signal and the canceled signal to provide a comparator output signal only when a ratio of strengths of the signals exceeds a predetermined value, said ratio comparator means consisting of an attenuator operatively arranged to pass and to attenuate the recieved signal, an amplitude detector operatively arranged to receive output from said attenuator and an amplitude comparator operatively arranged to receive the canceled signal and output from said amplitude detector; and
a signal processing means including a gate responsive to the comparator output signal for selectively passing the canceled signal whenever the comparator output signal is present, thereby providing clutter suppressed radar output.

26. A radar clutter suppressor according to claim 25, wherein said MTI processor means includes a phase detector having one input means coupled to receive the received signal and a second input means coupled to receive a phase reference signal.

27. A radar clutter suppressor according to claim 26, including means for supplying the phase reference signal as a variable reference signal.

28. A method of suppressing radar clutter comprising the steps of:
a. providing pulsed transmitted waves;
b. providing a first received signal receptive to doppler frequencies of radar echoes due to the pulsed transmitted waves and thereby providing a first received signal which includes a range of doppler frequencies;
c. providing delayed signals by delaying the first received signal;
d. providing a second signal by selectively attenuating doppler frequencies of the first received signal by combining said first received and said delayed signals;
e. attenuating said first signal and thereby providing a third signal;
f. comparing strengths of the second and the third signals and providing a first output signal when a ratio of the strengths exceeds a predetermined value; and
g. gating the second signal only in the presence of the first output signal to provide a gated signal constituting a clutter suppressed radar output.

29. A method of suppressing clutter according to claim 28, whereby high attenuation is provided for a band of doppler frequencies, said band centered at zero doppler frequency, for producing the second signal.

30. A method of suppressing clutter according to claim 29, whereby high attenuation is provided for a band of doppler frequencies, said band centered at a positive or negative frequency, for producing the second signal.

* * * * *